(12) United States Patent
Dubey et al.

(10) Patent No.: US 9,632,919 B2
(45) Date of Patent: Apr. 25, 2017

(54) REQUEST CHANGE TRACKER

(71) Applicant: LinkedIn Corporation, Mountain View, CA (US)

(72) Inventors: Manish Dubey, Fremont, CA (US); Daniel L. Grillo, Emerald Hills, CA (US); Sean Keenan, San Francisco, CA (US); Scott Holmes, Morgan Hill, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 338 days.

(21) Appl. No.: 14/042,101

(22) Filed: Sep. 30, 2013

(65) Prior Publication Data

US 2015/0095619 A1 Apr. 2, 2015

(51) Int. Cl.
*G06F 9/44* (2006.01)
*G06F 11/36* (2006.01)

(52) U.S. Cl.
CPC .................... *G06F 11/3688* (2013.01)

(58) Field of Classification Search
CPC .................................................. G06F 11/3688
USPC ................................................. 717/124–167
See application file for complete search history.

(56) References Cited

U.S. PATENT DOCUMENTS

| | | | |
|---|---|---|---|
| 6,256,773 B1 * | 7/2001 | Bowman-Amuah | 717/121 |
| 8,301,563 B2 * | 10/2012 | Silvera et al. | 705/42 |
| 8,312,430 B2 * | 11/2012 | Best et al. | 717/122 |
| 2002/0049962 A1 * | 4/2002 | Kelbaugh | G06F 11/3664 717/128 |
| 2005/0235263 A1 * | 10/2005 | Bundy | G06F 11/263 717/124 |
| 2008/0216056 A1 * | 9/2008 | Bate et al. | 717/127 |
| 2009/0138855 A1 * | 5/2009 | Huene et al. | 717/125 |
| 2011/0055799 A1 * | 3/2011 | Kaulgud et al. | 717/101 |

(Continued)

FOREIGN PATENT DOCUMENTS

WO WO2013115797 * 8/2013 ............. 717/127

OTHER PUBLICATIONS

Sampath, Sreedevi, et al. "A scalable approach to user-session based testing of web applications through concept analysis." Automated Software Engineering, 2004. Proceedings. 19th International Conference on. IEEE, 2004. pp. 1-10.*

(Continued)

*Primary Examiner* — Satish Rampuria
(74) *Attorney, Agent, or Firm* — Schwegman Lundberg & Woessner, P.A.

(57) ABSTRACT

An example request change tracker may be used to create, modify, monitor, and report events occurring within a development and testing pipeline with respect to one or more computing applications. A request change tracker may include a pipeline event detector, a testing stage detector, a control module, and a reporting module. The pipeline event detector detects a pipeline event indicative of a status of a code module with respect to a pipeline. The testing stage detector determines the associated testing stage in the pipeline, based on the pipeline event. The control module initiates actions with respect to the pipeline, based on the determined testing stage. The reporting module updates a reporting log with information related to the state, progress and results of a testing stage in the pipeline.

16 Claims, 4 Drawing Sheets

(56) References Cited

U.S. PATENT DOCUMENTS

2012/0017195 A1* 1/2012 Kaulgud ............. G06F 11/3692
717/101
2013/0007522 A1* 1/2013 Kurapati ............. G06F 11/3664
714/32
2013/0227573 A1* 8/2013 Morsi .................. G06F 9/5083
718/100

OTHER PUBLICATIONS

Vetter, Jeffrey S., and Bronis R. De Supinski. "Dynamic software testing of MPI applications with Umpire." Supercomputing, ACM/IEEE 2000 Conference. IEEE, 2000. pp. 1-10.*
Lyndsay, James, and Niel Van Eeden. "Adventures in session-based testing." Workroom Productions Ltd. May 27, 2003. pp. 1-17.*

* cited by examiner

REQUEST CHANGE TRACKER

TECHNICAL FIELD

This application relates to the technical fields of software and/or hardware technology and, in one example embodiment, to a request change tracker, which is a computer-implemented system configured to create, modify, monitor, and report events occurring within a development and testing pipeline.

BACKGROUND

In software development, it is not uncommon to make changes to source code of a computing application. The changes may be made in order to include a new or enhanced feature, to fix a bug, etc. The resulting computer-implemented product may be, for example, an on-line social network, which is as a platform to connect people in virtual space. An on-line social network may be a web-based platform, such as, e.g., a social networking web site, and may be accessed by a user via a web browser, via a mobile application, etc.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

An example system to create, modify, monitor, and report events occurring within a development and testing pipeline is described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

In one embodiment, a request change tracker may be used to create, modify, monitor, and report events occurring within a development and testing pipeline with respect to one or more computing applications. A computing application may be, e.g., a web service or a collection of web services. For example, an on-line social networking application may be designed and built as a collection of web services. For the purposes of this description the phrase "an on-line social networking application" may be referred to as and used interchangeably with the phrase "an on-line social network" or merely "a social network." It will also be noted that an on-line social network may be any type of an on-line social network, such as, e.g., a professional network, an interest-based network, or any on-line networking system that permits users to join as registered members.

As mentioned above, in software development, source code of a computing application may undergo revisions, as new features are being added, bugs being fixed, etc. Once the developer who works on the source code completes a change to the source code, the changed code can be transferred to a code repository. The process of transferring the changed code to a code repository may be termed a commitment process, which may include a request to commit a code module to a code repository, preliminary tests performed on the code module, assigning a specific version/revision identification to the code module, and storing the code module in the source code repository. The code that is being stored in the source code repository may be subject to version control and may be referred to as a code control and repository system. After a code module is committed to a source code repository, it can be included into an associated software component or an application by a build process. The resulting application may then be released in to a test environment and then, upon successful completion of testing, into a production environment. While developers may have complete control over the changes they are making to the source code, there is no easy way for developers to track what happens to their code after the code has been committed to the code repository.

A process that starts with a developer generating source code and ends with releasing the associated application to the public may be termed a development and testing pipeline or just a pipeline. A computer-implemented system configured to create, modify, monitor, and report events occurring in a pipeline may be referred to as a change request tracker (CRT). A change request tracker may be configured to track events associated with a code module from the time a developer requests to commit the code module to a code repository and up until the time when the code module is deployed as part of a computing application. A pipeline may include stages such as, e.g., the build process, deployment in a testing environment, partial deployment in a production environment, and full deployment in a production environment. A change request tracker may be utilized beneficially to achieve greater visibility into events associated with a code module after it has been committed to a code repository, to permit developers to issue control requests with respect to the pipeline, and also provides greater automation of the pipeline. In some embodiments, a change request tracker may provide a mechanism for early detection of problems that may be caused by changes to the source code.

A greater visibility into events associated with a code module after it has been committed in the code repository may be achieved, e.g., by providing a reporting module as part of the change request tracker. For example, after a code module has been committed to the code repository, the change request tracker may monitor events associated with the pipeline, store and report the collected information, and make this information available for viewing by the developer. The monitored information may include information such as the current status of the code module, past events associated with the code module, duration of testing of the code module, duration of various events associated with the code module, results of each stage of the pipeline, etc.

In one embodiment, a change request tracker may be configured to permit a user (e.g., a developer) to control the pipeline by submitting requests to the change request tracker, e.g., via a user interface (UI). For example, once the code has been built, a user may be permitted to request particular QA operations or test suits to be performed with respect to the code. A user may also request for the testing to be automated or manual and also to specify the manner in which the test results are to be delivered to the requesting user.

As mentioned above, a change request tracker may provide greater automation of the pipeline. In one embodiment, a change request tracker may be configured to automatically initiate, control, and report events performed within the pipeline. It will be noted that a code module that contains a change to the source code may be referred to as "a change to the source code." As a change to the source code is about to be committed to the source code repository, the source code first undergoes what is called pre-commit test. A pre-commit test suit may be initiated as part of the pipeline by the change request tracker, automatically, e.g. in response to detecting a request to commit a change to the source code to the source code repository. A pre-commit test suite may include inspecting the change in the source code to detect any inconsistencies with respect to semantics, dependencies, etc. Also as part of a pre-commit test suite, the source code may be compiled, after which and a limited number of functional tests may be performed. The pre-commit test suite may also include determining the type of a file that includes the change, and, based on the determined type of the file, determining which specific test cases should be included in the pre-commit test suite. The change to the source code is committed to the source code repository only if the pre-commit test suite is completed successfully, without errors. If the pre-commit test fails, the request to commit is denied. The failure of the pre-commit test is recorded and may also be reported, automatically, to the developer who submitted the commit request.

Another stage within the pipe is a so-called PCS test, which stands for "Post Commit Short." Once the code module code has passed, successfully, the pre-commit test and has been committed to the code repository the CRT initiates, automatically, a PCS test. A PCS test may include a series of test operations intended to determine, whether the change in the code module (as compared to earlier versions of the code module) provides the intended functionality or a bug fix. A PCS test stage may include compiling the code and deploying it to execute one or more unit tests, to execute one or more integration tests, etc. During the PCS stage, the change to the source code is being tested and validated in isolation. If the PCS test fails, the change request tracker automatically expels the code module containing the change from the code repository and replaces it with an earlier version of the code module.

Still another stage within the pipe is a so-called PCL test, which stands for "Post Commit Long." A PCL test is a batch process, and it takes into consideration not only a single change to the subject code module, but also other changes to that code module and also other code modules associated with the same computing application. For example, a PCL test may be designed to test all changes to the source code that have been committed to the code repository since a certain time, e.g., the changes to the code that have been committed to the code repository within the last two hours. The change request tracker may be configured to initiate, automatically, a PCL test so that all the changes to the code are tested together. A PCL test may include a suite of tests. If the PCL test fails, the change request tracker may generate an alert indicating that the code repository is unstable. In some embodiments, the change request tracker may be configured to automatically stop the pipeline, such that no further commit operations to the code repository are permitted until the reason for the PCL test failure is identified and the specific changes that caused the PCL test failure are rolled back in the code repository. Once the problem that caused the PCL test failure is identified and the offending code changes are rolled back in the code repository, the change request tracker automatically resumes the pipeline. The condition where the pipeline is stopped may be termed a trunk lock.

In some embodiments, the tests are not always directly triggered by the change request tracker. The tests may be triggered, e.g., by mechanisms provided in the source code repository that send events and results to the change request tracker for recording.

In some embodiments, the change request tracker may be configured to monitor the pipeline and collect metrics with respect to efficiency of each pipeline stage. These metrics may be stored, analyzed and reported by the change request tracker. The change request tracker may also be configured to collect statistics, such as the average percent of the time that the pipeline is operational, or the average percent of the time that the pipeline is stopped. The change request tracker may also be configured to permit automatic operations only during certain hours of the day, such as, e.g., during business hours.

A version of application code that has gone through the test and build pipeline successfully may be termed a versioned artifact and may be stored in a versioned artifact storage system. A versioned artifact may be deployed on a fabric. A fabric is a collection of computer systems in a data center that may be located remotely from the location of a server system hosting the change request tracker. In some embodiments, the change request tracker may be configured to automatically deploy a versioned artifact on a fabric, to schedule automatic deployment of a versioned artifact on a fabric, to request pre-deployment QA testing, and to also to periodically request and monitor so-called health check tests with respect to the fabric. In one embodiment, a healthcheck is way to sanity test complete system in the context of all changes that were deployed on a fabric. It tests basic functionality of the entire site.

Figure 1:
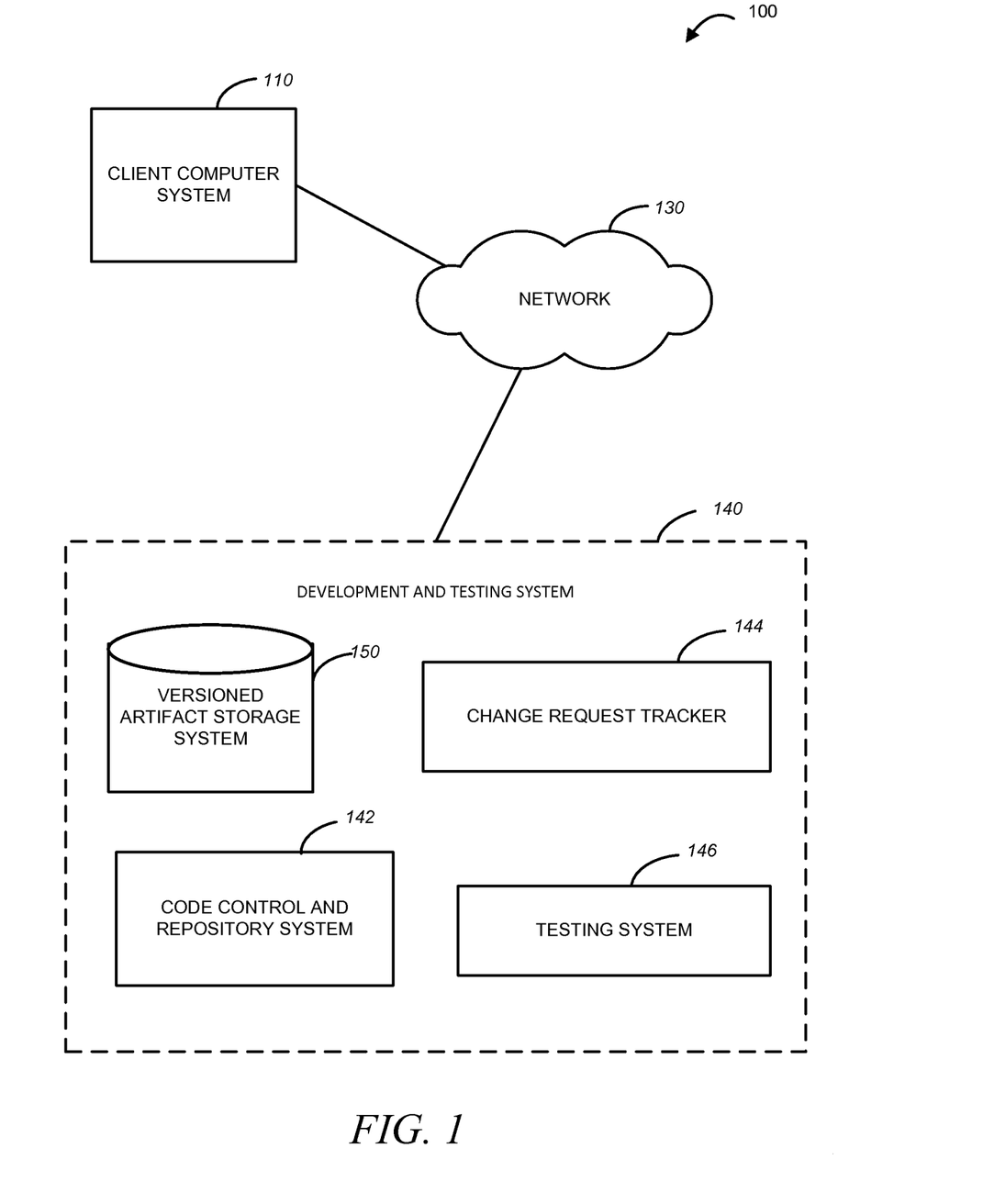
FIG. 1 is a diagrammatic representation of a network environment within which an example request change tracker may be implemented.

An example change request tracker system may be implemented in the context of a network environment 100 illustrated in FIG. 1. As shown in FIG. 1, the network environment 100 may include a code control and repository system 142, a change request tracker 144, a testing system 146, and a versioned artifact storage system 150, which collectively may be referred to as a development and testing system 140. As described above, the change request tracker 144 may be provided to provide greater visibility into events associated with code after it has been committed to a code repository, to permit developers to issue control requests with respect to the pipeline, and also to provide greater automation of the development and testing pipeline. In one embodiment, information tracked by the change request tracker 144 may be accessible by users (e.g., developers) from their client machines, such as, e.g., from a client computer system 110, via a communications network 130. The communications network 130 may be a public network (e.g., the Internet, a mobile communication network, or any other network capable of communicating digital data).

The code control and repository system 142 may be configured to permit version control of application code, storing of the application code, etc. The testing system 146 may be configured to generate, store, and execute test scripts, to monitor and process test results, etc. The change request tracker 144 may be configured to communicate with the code control and repository system 142 and also with the testing system 146. For instance, the change request tracker 144 may send to the code control and repository system 142 a trunk lock instruction, such that no further code changes are permitted to be committed into the code until the trunk lock is released. The change request tracker 144 may also communicate to the testing system 146 a request to execute a particular stage in the pipeline and may also obtain the testing system 146 results of the tests. Results of the build process are stored in the versioned artifact storage system 150 for use in later stages of the pipeline. An example change request tracker is illustrated in FIG. 2.

Figure 2:
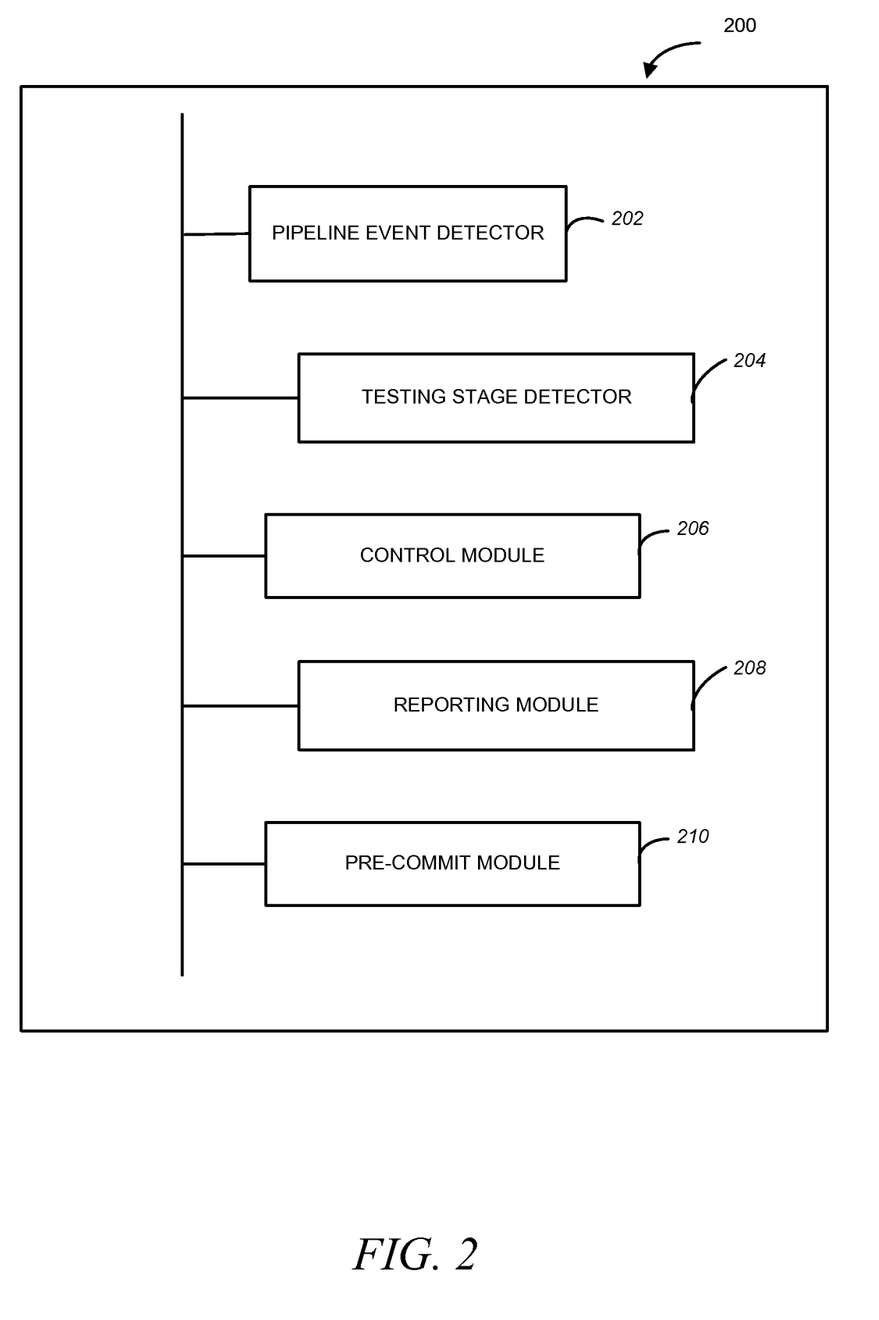
FIG. 2 is block diagram of a request change tracker, in accordance with one example embodiment.

FIG. 2 is a block diagram of a change request tracker system 200. As shown in FIG. 2, the system 200 includes a pipeline event detector 202, a testing stage detector 204, a control module 206, and a reporting module 208. The pipeline event detector 202 may be configured to detect a pipeline event. A pipe line event may be indicative of a status of a code module with respect to a pipeline. For example, a pipeline event may indicate successful completion of a PCS test with respect to the code module. Another example of a pipeline event is an indication of a failure associated with the code module and the testing stage in the pipeline. Yet another pipeline event may be a request initiated by a developer that specifies a particular manner, in which the code module is to be tested. As explained above, the pipeline may be viewed as a process comprising a plurality of testing stages with respect to one or more code modules. A code module may be stored in the code control and repository system 142 of FIG. 1 and may have a unique version identification. A version identification may be associated with specific changes to the code included in that version of the code module. Changes included in a version of a code module are compiled via a build process in the pipeline and stored as versioned artifacts in versioned artifact storage system 150.

The testing stage detector 204 may be configured to determine a testing stage in the pipeline, based on the pipeline event. For example, when the detected event is a completion of completion of a PCL test, testing stage detector 204 may conclude that the testing stage is the PCL testing stage in the pipeline. The control module 206 may be configured to initiate one or more actions with respect to the pipeline, based on the determined testing stage. For example, the control module 206 may issue, to the code control and repository system 142, a request to remove, from the code control and repository system 142, changes associated with the code module having certain version identification. Another example of actions initiated, automatically, by the control module 206 is a trunk lock action, where the control module 206 or the code control and repository system 142 prevents any further commit operations with respect to the code control and repository system 142. The control module 206 may also initiate testing of a code module in a manner specified by a developer, e.g., using one or more parameters associated with a request from the developer.

The reporting module 208 may be configured to update a reporting log with information related to the state, progress and results of a testing stage in the pipeline. The reporting log may be viewable by users (e.g., developers), e.g., via a graphical user interface (GUI).

As shown in FIG. 2, the system 200 also includes a pre-commit module 210. The pre-commit module 210 may be configured to participate in processing pre-commit requests with respect to the code repository 150. In one embodiment, the pre-commit module 210 may detect a request to commit a code module into the code repository, automatically initiating a pre-commit test to be executed by the testing system 146 of FIG. 1, and allow or reject the request based on success or failure results of the pre-commit test. Example operations performed by the system 200 may be described with reference to FIG. 3.

Figure 3:
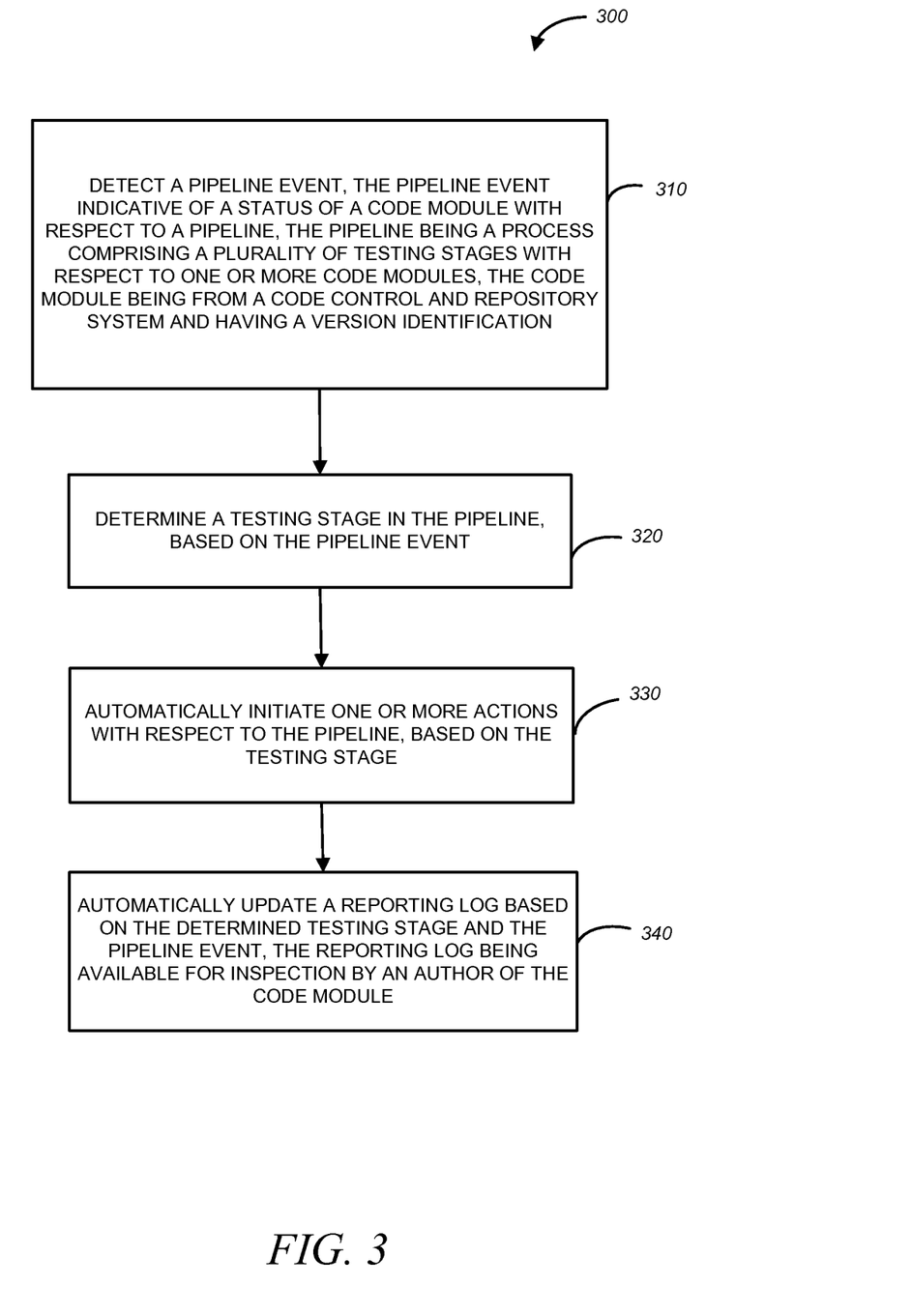
FIG. 3 is a flow chart of a method for utilizing a request change tracker, in accordance with an example embodiment.

FIG. 3 is a flow chart of a method 300 for utilizing a change request tracker system, according to one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the development and testing system 140 of FIG. 1 and, specifically, at the change request tracker system 200 shown in FIG. 2.

As shown in FIG. 3, the method 300 commences at operation 310, when the pipeline event detector 202 of FIG. 2 detects a pipeline event, which may be indicative of a status of a code module with respect to a pipeline. For example, a pipeline event may indicate successful completion of testing stage within the pipeline. At operation 320, the testing stage detector 204 of FIG. 2 determines a testing stage in the pipeline, based on the detected pipeline event. The control module 206 initiates, at operation 330, one or more actions with respect to the pipeline, based on the determined testing stage, such as, for example, for example, issuing a request to remove, from the code repository 150, changes associated with the code module having certain version identification. At operation 340, the reporting module 208 updates a reporting log with information related to the state, progress and results of the determined testing stage in the pipeline.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Figure 4:
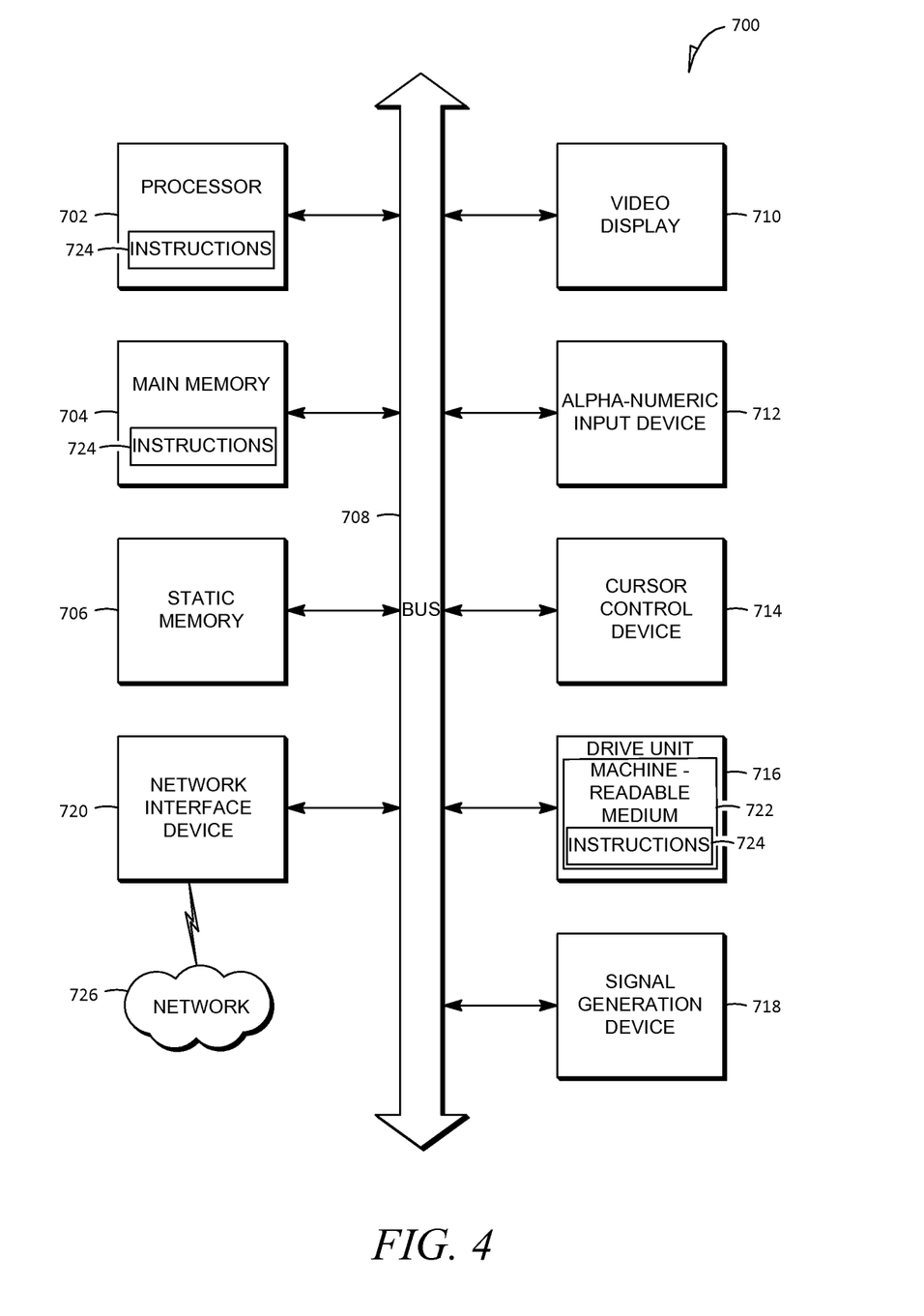
FIG. 4 is a diagrammatic representation of an example machine in the form of a computer system within which a set of instructions, for causing the machine to perform any one or more of the methodologies discussed herein, may be executed.

FIG. 4 is a diagrammatic representation of a machine in the example form of a computer system 700 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a target machine in a server-target network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 707. The computer system 700 may further include a video display unit 710 (e.g., a liquid crystal display (LCD) or a cathode ray tube (CRT)). The computer system 700 also includes an alpha-numeric input device 712 (e.g., a keyboard), a user interface (UI) navigation device 714 (e.g., a cursor control device), a disk drive unit 716, a signal generation device 718 (e.g., a speaker) and a network interface device 720.

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, with the main memory 704 and the processor 702 also constituting machine-readable media.

The software 724 may further be transmitted or received over a network 726 via the network interface device 720 utilizing any one of a number of well-known transfer protocols (e.g., Hyper Text Transfer Protocol (HTTP)).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

MODULES, COMPONENTS AND LOGIC

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, target or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, a change request tracker system has been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A method comprising:
   detecting a pipeline event, the pipeline event indicative of a status of a code module with respect to a pipeline, the pipeline being a process comprising a plurality of testing stages with respect to one or more code modules, the code module being from a code control and repository system, the code module having a version identification;
   determining a testing stage from a plurality of testing stages in the pipeline, based on the pipeline event;
   automatically initiating one or more actions with respect to the pipeline, based on the testing stage, wherein the one or more actions comprise automatically preventing further commit operations with respect to the code control and repository system;
   automatically, using at least one processor, updating a reporting log with information related to state, progress and results of the testing stage in the pipeline, based on the determined testing stage, the reporting log being available for inspection by an author of the code module;
   detecting a request to commit a further code module into the code control and repository system;
   automatically initiating a pre-commit test; and
   rejecting the request to commit the further code into the code control and repository system in response to a failure of the pre-commit test.

2. The method of claim 1, wherein the pipeline event is an indication of a completion of the testing stage in the pipeline.

3. The method of claim 1, wherein the pipeline event is an indication of a failure associated with the code module and the testing stage in the pipeline.

4. The method of claim 1, wherein the one or more actions comprise a request to remove, from the code control and repository system, changes associated with the code module having the version identification.

5. The method of claim 1, wherein a stage from the plurality of testing stages with respect to one or more code modules comprises a post-commit short test.

6. The method of claim 1, wherein a stage from the plurality of testing stages with respect to one or more code modules comprises a post-commit long test.

7. The method of claim 1, comprising:
   detecting a developer request, the developer request specifying a parameter for testing the code module; and
   in response to the developer request, initiating testing of the code module utilizing the parameter.

8. The method of claim 7, wherein the parameter indicates a particular test to be performed with respect to the code module.

9. A computer-implemented system comprising:
   at least one processor coupled to a memory;
   a pipeline event detector to detect, using the at least one processor, a pipeline event, the pipeline event indicative of a status of a code module with respect to a pipeline, the pipeline being a process comprising a plurality of testing stages with respect to one or more code modules, the code module being from a code control and repository system, the code module having a version identification;
   a testing stage detector to determine, using the at least one processor, a testing stage from a plurality of testing stages in the pipeline, based on the pipeline event;
   a control module to initiate, using the at least one processor, one or more actions with respect to the pipeline, based on the testing stage, wherein the one or more actions comprise automatically preventing further commit operations with respect to the code control and repository system; and
   a reporting module to update, using the at least one processor, a reporting log with information related to state, progress and results of the testing stage in the pipeline, based on the determined testing stage, the reporting log being available for inspection by an author of the code module; and
   a pre-commit module to, using the at least one processor:
      detect a request to commit a further code module into the code control and repository system;

automatically initiate a pre-commit test; and reject the request to commit the further code into the code control and repository system in response to a failure of the pre-commit test.

10. The system of claim 9, wherein the pipeline event is an indication of a completion of the testing stage in the pipeline.

11. The system of claim 9, wherein the pipeline event is an indication of a failure associated with the code module and the testing stage in the pipeline.

12. The system of claim 9, wherein the one or more actions comprise a request to remove, from the code control and repository system, changes associated with the code module having the version identification.

13. The system of claim 9, wherein a stage from the plurality of testing stages with respect to one or more code modules comprises a post-commit short test.

14. The system of claim 9, wherein a stage from the plurality of testing stages with respect to one or more code modules comprises a post-commit long test.

15. The system of claim 9, wherein:

the pipeline event detector is to detect a developer request, the developer request specifying a parameter for testing the code module; and the control module is to initiate testing of the code module utilizing the parameter, in response to the developer request.

16. A machine-readable non-transitory storage medium having instruction data to cause a machine to perform operations comprising:

detecting a pipeline event, the pipeline event indicative of a status of a code module with respect to a pipeline, the pipeline being a process comprising a plurality of testing stages with respect to one or more code modules, the code module being from a code control and repository system, the code module having a version identification;

determining a testing stage from a plurality of testing stages in the pipeline, based on the pipeline event;

initiating one or more actions with respect to the pipeline, based on the testing stage, wherein the one or more actions comprise automatically preventing further commit operations with respect to the code control and repository system;

updating a reporting log with information related to state, progress and results of the testing stage in the pipeline, based on the determined testing stage, the reporting log being available for inspection by an author of the code module;

detecting a request to commit a further code module into the code control and repository system;

automatically initiating a pre-commit test; and rejecting the request to commit the further code into the code control and repository system in response to a failure of the pre-commit test.

* * * * *

UNITED STATES PATENT AND TRADEMARK OFFICE
CERTIFICATE OF CORRECTION

| | | |
|---|---|---|
| PATENT NO. | : 9,632,919 B2 | Page 1 of 1 |
| APPLICATION NO. | : 14/042101 | |
| DATED | : April 25, 2017 | |
| INVENTOR(S) | : Dubey et al. | |

It is certified that error appears in the above-identified patent and that said Letters Patent is hereby corrected as shown below:

On the Title Page

In item (73), in "Assignee", in Column 1, Line 1, delete "Sunnyvale," and insert --Mountain View,-- therefor Signed and Sealed this
Tenth Day of July, 2018

Andrei Iancu
*Director of the United States Patent and Trademark Office*